Feb. 7, 1933. J. LEDWINKA 1,896,632

DEVICE FOR AND METHOD OF SECURING WINDBREAKS

Filed Oct. 2, 1929

INVENTOR.
JOSEPH LEDWINKA.
BY
ATTORNEY.

Patented Feb. 7, 1933

1,896,632

UNITED STATES PATENT OFFICE

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA

DEVICE FOR AND METHOD OF SECURING WINDBREAKS

Application filed October 2, 1929. Serial No. 396,823.

My invention relates generally to windbreaks designed for sealing the joints between the jambs of swinging closures for vehicle bodies and more particularly to a method and device for securing them in position.

It is an object of my invention to provide such a device and method which facilitates the assembling of the windbreak in position and whereby it is securely held in place when assembled. I attain these objects in the main by simplifying the construction of the securing means by stamping out tabs out of a metal panel adjacent the windbreak seat, which can be readily bent over a portion of the windbreak strip to secure it in place.

Figure 1:
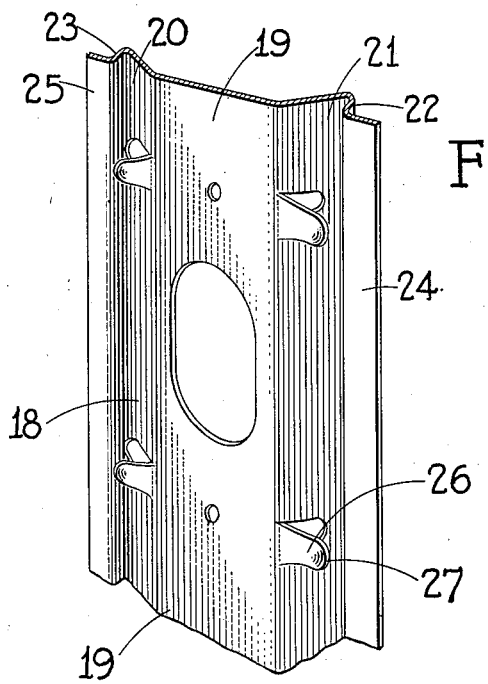

In the drawing, I have shown in Figure 1 a section of a sheet metal panel adapted to form the inner surface of a frame member adjacent the edge of a doorway opening in a vehicle body and embodying the invention.

Figure 2:
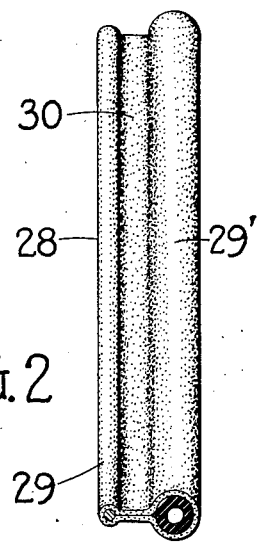
Figure 3:
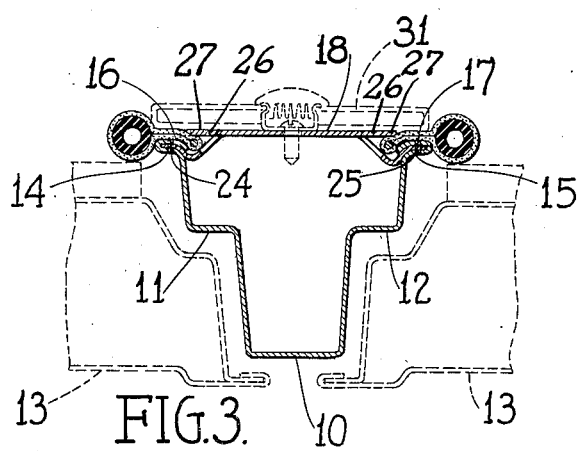

Figure 2 shows a section of a windbreak adapted to be used in connection with my invention, and Figure 3 is a cross section of a post structure between the front and rear door openings of a vehicle body showing the windbreak secured thereto according to the device and method of my invention.

In the drawing I have shown the invention applied to a vehicle body construction in which the body paneling and framing around the closure openings is made up of an outer panel flanged inwardly to form the jambs of the doors, and an inner panel connected to the inner edges of the outer panel to reinforce the outer panel and to provide means to seat and secure the interior trim.

I have shown the invention applied to the B—C post of a vehicle body or the post extending upwardly between the front and rear door openings, but it will be understood that it may be applied along the edges of any closure opening having a closure adapted to close against a jamb face extending around the edge of the opening.

This post is comprised of an outer panel 10 flanged inwardly in the margins of the door openings to form the stepped jamb faces 11 and 12 adapted to receive thereagainst the correspondingly stepped edges of the doors, illustrated at 13.

At their inner edges, these jamb face portions are formed with lateral door overlap flanges 14 and 15 which are extended by flanges 16 and 17. The inner reinforcing flanges 16 and 17. The inner reinforcing panel 18 of the post, a section of which is shown separately in Fig. 1 is formed with a substantially flat central portion 19, and horizontal outwardly extending beads forming channel or depressions 20 and 21 on their inner sides and outer shoulders 22 and 23 on their outer sides. Laterally beyond these channels the panel is formed with edge flanges 24 and 25. When the inner panel stamping 18 is assembled with the outer panel stamping 10, the shoulders 22 and 23 seat against the insides of the jamb face portions 11 and 12 and the outer edge flanges 24 and 25 seat against the door overlap flanges 14 and 15 of the outer panel to which they may be secured by spot welding, and additionally by crimping the extensions 16 and 17 over the flanges 24 and 25, and their extreme edges down into the channels 20 and 21 to form a locked crimped joinder.

Prior to the assembly of the inner panel 18 to the outer panel 10, it is formed, as shown in Fig. 1, with struck out tabs 26, the free ends 27 of which are bent away from the body of the panel, as shown in Fig. 1.

The windbreak 28, a section of which is shown separately in Figure 2, is comprised in this instance of a relatively unyielding beaded portion 29 along one edge, and a yielding beaded portion 29' of larger cross section along the other edge, the beaded portions being joined by a fabric strip 30 of less thickness than the beaded edges.

To assemble this with the post, an end thereof is applied with the unyielding bead 29 seated in the channel, at 20, and the adjacent tab 26 is bent down upon the bead, as shown in Fig. 3, to lock it in the channel. The end of the windbreak strip being so secured, it is progressively inserted into the channel, which may extend all the way or part way around the doorway opening, and the tabs successively bent down until the windbreak has been secured entirely around the opening or to so much of it as it is desired to apply it.

Thus it is securely held in position without the use of additional securing means, by the integral struck out tabs formed integrally with the panel and permits the ready assembly of the inner upholstery panel indicated at 31 which covers over the inner paneling and tabs and clamps the portion 30 of the weather strip between its edge portions and the door overlapped crimped edge of the post, the rigid upholstery panels additionally securing it in position after their application.

Thus it will be seen that I have provided a simplified construction and method of assembly of the windbreak which, while providing a secure joinder of the windbreak, also speeds up the assembly thereof to a marked degree, and thus results in marked economies of time and material in the art to which it relates.

While I have herein described the invention as relating more particularly to the attachment of windbreaks, it will be understood that some of the main features thereof are also applicable to devices for securing upholstery or other trim of a vehicle body generally, and I do not wish to limit myself in the broader aspects of the invention to devices for securing windbreaks per se.

What I claim is:

In combination, a grooved metal paneling, an upholstery element seated in the groove, metal tabs struck wholly from the side wall of the groove and pressed down upon the upholstery element with their outer faces flush with the outer face of the metal paneling, and an upholstery covering for the metal panel in contact with its outer face and overlying the element in the groove and the tabs which hold it in place, whereby the smoothness of the metal panel and its upholstery facing is undisturbed by the tabs.

In testimony whereof I hereunto affix my signature.

JOSEPH LEDWINKA.